United States Patent [19]

Elias

[11] Patent Number: 4,588,592

[45] Date of Patent: May 13, 1986

[54] CHEWING GUM PRODUCT AND COMPOSITION AND PROCESS FOR THE PREPARATION THEREOF

[75] Inventor: Ronald J. Elias, Mount Laurel, N.J.

[73] Assignee: Fleer Corporation, Philadelphia, Pa.

[21] Appl. No.: 631,924

[22] Filed: Jul. 18, 1984

[51] Int. Cl.⁴ ............................................. A23G 3/30
[52] U.S. Cl. ...................................................... 426/5
[58] Field of Search ........................................ 426/3–6, 426/96

[56] References Cited

U.S. PATENT DOCUMENTS

| | | | |
|---|---|---|---|
| 3,262,784 | 7/1966 | Bucher | 426/5 |
| 4,000,321 | 12/1976 | Mochizuki et al. | 426/5 |
| 4,100,301 | 7/1978 | Friello et al. | 426/3 |
| 4,254,149 | 3/1981 | Rudolph et al. | 426/5 |
| 4,271,198 | 6/1981 | Cherukuri et al. | 426/5 |
| 4,271,199 | 6/1981 | Cherukuri et al. | 426/5 |
| 4,370,350 | 1/1983 | Fisher et al. | 426/5 |
| 4,405,647 | 9/1983 | Fisher et al. | 426/4 |
| 4,496,592 | 1/1985 | Kuwahara et al. | 426/5 |

*Primary Examiner*—Jeanette Hunter
*Attorney, Agent, or Firm*—Dann, Dorfman, Herrell and Skillman

[57] ABSTRACT

A shaped chewing gum product made from a composition in the form of a semifluid conglomerate consisting essentially of an intimate mixture of substantially dry granulated sugar, the predominant particle size of which is between about 210 microns and about 850 microns, and substantially dry chewing gum base, with coloring and flavoring additives incorporated therein. The chewing gum product may contain different coloring and/or flavoring additives which are distinctly, visually and/or gustatively discernable in the product.

37 Claims, No Drawings

4,588,592

CHEWING GUM PRODUCT AND COMPOSITION AND PROCESS FOR THE PREPARATION THEREOF

BACKGROUND OF THE INVENTION

The present invention relates to a novel chewing gum product and to a composition and process for making the same. More specifically, the present invention relates to the preparation of a novel chewing gum product having desirable chewing quality from a substantially dry, semifluid batch material which may be readily formed into any desired shape. The batch material may include a plurality of different coloring and/or flavoring additives, with the additives being distinctly discernable in the finished product.

In U.S. Pat. No. 3,262,784, which is commonly assigned with the present application, there is described a chewing gum product composed of dry, finely divided sugar and essentially water-free chewing gum base, with conventional chewing gum flavoring and coloring additives incorporated therein. In preparing this patented product, dry powdered sugar (preferably of a particle size such that at least about 95% passes through an 80 mesh screen) is mixed with essentially moisture-free chewing gum base until the powdered sugar is completely dispersed in the chewing gum base. The resulting product is a dry, non-tacky, friable, free-flowing material which is formed into a desired shape under relatively high compressive force, in a conventional tableting machine. The compressed, finished chewing gum product is disclosed as having excellent chewing qualities, and possessing other desirable properties, including resistance to moisture and oxidative-deterioration and enhanced flavor characteristics, as compared to conventional chewing gum products.

The substantial elimination of water from the gum product of U.S. Pat. No. 3,262,784, as briefly described above, represents a significant departure from the approach generally employed in making chewing gum products. Chewing gums, including adult chewing gum and bubble gum, are typically prepared by mixing heated chewing gum base, an aqueous sugar syrup (principally corn syrup or glucose), dry sugar (sucrose or dextrose) and a flavoring additive. The aqueous syrup has generally been regarded by those skilled in the art as a necessary component insofar as conventional commercial manufacture is concerned. The batch material discharged from the mixing vessel is a tough, taffy- or dough-like mass containing from 3 to 5 percent, by weight, of moisture, and is formed into the finished product by extrusion or rolling, and scoring or cutting. Moreover, conventional chewing gum products are sensitive to atmospheric moisture, requiring wrapping of each individual piece in a moisture-resistant wrapper, or providing the pieces with a moisture-resistant coating. Conventional chewing gum products also possess poor resistance to oxidative-deterioration.

SUMMARY OF THE INVENTION

In accordance with one aspect of the present invention, there is provided a composition, in the form of a semifluid conglomerate consisting essentially of an intimate mixture of substantially dry granulated sugar, and substantially dry chewing gum base. The predominant particle size of the granulated sugar used in the practice of this invention is between about 210 microns and about 850 microns. A minor amount, i.e. generally less than ten percent, of particles whose size is less than than 210 microns or greater than 850 microns, may be tolerated. This composition is employed as the batch material in making the novel chewing gum product of this invention. The particle size of the sugar component of the composition of this invention is significantly larger than the powdered sugar used in making the chewing product of the above-mentioned U.S. Pat. No. 3,262,784 the latter having an average particle size of about 75 microns. The use of relatively larger size sugar particles gives rise to certain desirable characteristics in the composition of this invention, not possessed by the patented composition. For example, the composition of the present invention is a semifluid, relatively cohesive conglomerate having a consistency similar to wet, shaved coconut, which enables the production of gum products in a variety of shapes and sizes by various forming operations commonly employed in the manufacture of chewing gum and confectionary products. By contrast, the non-tacky, friable, free-flowing composition of the above-mentioned patent requires a compression forming operation employing, for example, a tableting machine, as previously noted, generally operated at a pressure of about five to ten tons. Thus, the size and shape of the final product produced according to U.S. Pat. No. 3,262,784 is relatively limited, unless special presses are utilized.

According to another aspect of the present invention, there is provided novel shaped chewing gum products made from the above-described composition. The chewing gum product of the present invention may have incorporated therein different coloring and/or flavoring additives, which are distinctly discernable in the finished product. The batch material employed in the above-mentioned patent is not adaptable to the production of such multi-colored and multi-flavored products. This is because the smaller particle size of the powdered sugar component employed therein permits different coloring or flavoring additives to merge together upon blending, thus preventing the discernment of distinct colors and flavors in the finished product.

The chewing gum product of the present invention also has longer lasting flavor as compared with the product of U.S. Pat. No. 3,262,784. This flavor enhancement is due to the slow solubility rate of the relatively large particle size of the sugar component used in the product of this invention.

Another desirable property of the product of the present invention is its relatively low density, generally between 0.5 and 1.0 g./cc., which imparts thereto a unique, spongy chewing quality not possessed by chewing gum products commercially available heretofore.

The chewing gum product described herein also shares certain desirable properties in common with the product of U.S. Pat. No. 3,262,784, in that it is resistant to deterioration due to moisture loss and oxidation, as compared to conventional chewing gum.

According to a further aspect of the present invention, there is provided a process for making a shaped chewing gum product by mixing substantially dry molten chewing gum base with substantially dry granulated sugar, within the above-noted particle size range, to provide a batch material in the form of a semifluid or flowable conglomerate of sugar particles coated with chewing gum base, and subjecting the batch material to a forming operation in a mold to produce a shaped product of desired configuration and size.

The process of the present invention is decidedly more efficient than that disclosed in the above-mentioned patent. In the latter process, powdered sugar must be added in increments to the chewing gum base, and care must taken not to add to great an amount of sugar at any one time. In addition, it is disclosed in the above-mentioned patent that attempts to add chewing gum base to the sugar were unsuccessful. No such restrictions are applicable to the process of the present invention. The granulated sugar and chewing gum base may be mixed en masse, with chewing gum base being added to the granulated sugar. Indeed, addition of the chewing gum base to the sugar is the preferred manner for carrying out the present process, in order to prevent sticking of the gum base to the walls of the mixer.

In a modification of the process just described, which is also within the scope of the present invention, a plurality of separate batch materials may be prepared, each having a different coloring additive incorporated therein, and combined to form a master batch material which is molded into a final product. The various coloring additives are distinctly visually discernable in the finished product, imparting a multi-colored appearance thereto. This modified process may also be used with different flavoring additives to produce a final product in which the various flavoring additives are distinctly gustatively discernable imparting a multi-flavored taste thereto. Various combinations of different coloring and flavoring additives may be used, if desired.

Other details, objects and advantages of the present invention will become apparent from the following detailed description thereof.

DETAILED DESCRIPTION OF THE INVENTION

The two principal components of the chewing gum product of the present invention are chewing gum base and granulated sugar. The chewing gum base employed is essentially free of water, i.e. it contains no more than about 1% by weight of water. Any gum base normally used in making chewing gum, including adult chewing gum and bubble gum, may be used in practicing this invention. As is well known, chewing gum base is composed of natural and/or synthetic gums or elastomers, plasticizers and film-forming extenders. Examples of natural gums or elastomers are natural rubber, chicle, lechi caspi and jelutong, and typical synthetic elastomers are polyisobutylene, isobutylene-isoprene copolymer, and butadiene-styrene copolymer. Suitable plasticizers include oleaginous or fatty materials, such as cocoa butter and hydrogenated vegetable oils. Film-forming extenders are usually synthetic resins, examples of which are polyvinyl acetate and ester gums, including esters of rosin and hydrogenated esters of rosin, such as the glycerol esters of hydrogenated rosin, and the like. In addition, in compounding chewing gum base, small amounts of an emulsifier, such as glycerol monostearate; and an antioxidant, such as butylated hydroxyanisole and butylated hydroxytoluene, may be used. The principal difference between bubble gum base and adult chewing gum base is in the elastomer content of each, the former generally averaging about 8 to 14% of elastomer and the latter generally averaging about 3 to 8% of elastomer, the balance in both cases being made up essentially of film-forming extender resin and plasticizer. A suitable bubble gum base for use in the present invention comprises, by weight, 10.0 percent butadiene-styrene copolymer, 42.0 percent glycerol ester of hydrogenated rosin, 20.9 percent calcium carbonate, 6.25 percent paraffin wax, 9.5 percent cocoa butter, 10.3 percent hydrogenated vegetable oil and 1.05 percent glycerol monostearate. A representative adult chewing gum base comprises 16.0 percent chicle, 10.0 percent lechi caspi, 1.9 percent butadiene-styrene copolymer, 1.6 percent natural rubber, 24.8 percent glycerol ester of hydrogenated rosin, 21.2 percent calcium carbonate, 14.1 percent paraffin wax, 0.5 percent cocoa butter, 1.3 percent hydrogenated vegetable oil, 1.0 percent glycerol monostearate, 2.6 percent starch and 5.0 percent microcrystalline wax. Of course, other gum base formulations may also be used. However, the preferred gum base for use in the present invention is bubble gum.

Unlike the manufacture of conventional chewing gum, which requires the use of an aqueous sugar syrup, typically corn syrup or glucose, as a substantial part of the sweetner component, the present invention employs only dry, granulated sugar, i.e. sugar containing no more than one percent, by weight, of water. The term "granulated sugar" is used herein to refer to any sugar the predominant particle size of which is between about 210 microns and about 850 microns. Sugars which may be used in the practice of the present invention include sucrose, dextrose, (anhydrous or the monohydrate), mannitol or sorbitol, or a combination thereof, in dry granular form, having the the aforementioned particle size. Any water of crystallization associated with the sugar, as in dextrose monohydrate, will not interfere with obtaining a batch material having the properties described above. Other dry, granular sugars may be used, such as spray-dried glucose, lactose and fructose, or a combination thereof. Because of the greater expense of fructose, it is preferred that, when used, it constitute only a minor proportion of the sugar content, advantageously less than about 15% of the final product.

Coloring and flavoring additives may be incorporated in the product if desired, as is common in chewing gum manufacture. The color, when used, will be a certified vegetable or synthetic dye. The coloring agent may be added as a powder or as a liquid concentrate. Any water associated with the color is negligible as far as the overall chewing gum composition is concerned. Typical flavors include peppermint, fruit extracts, and the like. The flavoring agent may be added in the form of a powder or liquid (oil). Such additives may be preliminarily incorporated in the chewing gum base or subsequently added thereto during mixing with the sugar. In addition, small amounts of other additives may be incorporated in the product, as by introduction initially in the chewing gum base, by mixing in with the sugar or by mixing into the final batch material. Such additives may include, for example, waxes, such as microcrystalline wax and paraffin wax; solid fats; calcium carbonate, and the like, which serve to control chewing and other properties of the product.

The proportions of the principal ingredients, i.e. granulated sugar and chewing gum base, may vary over relatively broad ranges. In general, the product may contain, by weight, from about 70 to about 95 percent sugar and from about 5 to about 30 percent chewing gum base. Preferably, the product contains, by weight, from about 80 to about 90 percent sugar and from about 10 to about 20 percent gum base. Any flavoring additive is added to taste in accordance with recognized practice. The same applies to the coloring additive. The amount of coloring and/or flavoring additives incorporated in the finished product is relatively small, generally comprising, by weight, from about 0.4 to about 2.0 percent thereof. The other amounts of the possible additives referred to above are essentially incidental as far as the final product is concerned. Thus, the product may be considered as consisting essentially of the chewing gum base and granulated sugar. The specific proportions of components selected may depend upon various factors which will occur to those skilled in the art, especially the nature of the particular chewing gum base and the nature of the granulated sugar employed.

The batch material employed in the present invention is conveniently prepared using conventional chewing gum mixing apparatus. A sigma blade mixer equipped with a steam-heated jacket is suitable for this purpose. An appropriate amount of granular sugar is placed in the mixer and heated to a temperature between about 125° F. to about 200° F., and preferably between about 180° F. and about 190° F. Molten chewing gum base, along with any coloring or flavoring additive is then introduced into the mixer. The chewing gum base is rendered molten by heating to a temperature of about 130° F. to about 250° F. As previously noted, the sugar goes into the mixer before the chewing gum base, in order to prevent sticking of the gum base to the walls of the mixer.

During mixing, the components of the batch material are subject to a combined pulling, kneading and rubbing action by virtue of the revolving sigma blades, so that the sugar particles are pushed into the chewing gum base and the mass is continuously being broken into pieces and the pieces recombined and pressed together. Mixing is continued for a time sufficient for the formation of the previously described semifluid conglomerate, made up of sugar particles coated with the chewing gum base. A suitable mixing time for a batch material weighing approximately one hundred pounds and having a sugar context of approximately eighty-five percent is on the order of five minutes. Appropriate mixing times for larger or smaller batches, or batches of different sugar content may readily be determined by trial.

The batch material is discharged from the mixer while it is still hot, its temperature generally being in the neighborhood of about 190° F. to about 200° F. Of course, the temperature may vary depending on the initial temperature of the sugar and gum base.

The batch material may undergo various forming operations to produce the final product. Generally, forming operations involving the application of light pressure are preferred to ensure the production of a relatively low density products. Such operations include forming a molded product in a mold or framed plate, forming a sheeted product on a conveyor belt, or forming a particulate product of various particle sizes by applying the batch material and comminuting it while cold.

The molding operation is conveniently carried out using conventional confectionary molds. The batch material is transferred while hot to the molds and allowed to cool to form the finished chewing gum product. Charging of the molds with the batch material may be done manually, or it may be automated, using equipment well known to those skilled in the art.

Alternatively, the batch material may be applied while hot to a conveyor belt, forming a sheet, which is then scored vertically and horizontally, as in the manufacture of stick chewing gum. The batch material is conveniently formed into continuous sheets sixteen inches wide by and about one and one half inch thick. The dimensions of the scored portions of the sheet may vary, depending, or, upon the criteria of the product and/or the suitability of the conventional packaging equipment.

Because the batch material is subjected only to relatively light pressure in the aforesaid forming operations, the resultant product has a density considerably lower than that of conventional chewing gum, and lower than the density of the chewing gum product of the above-mentioned U.S. Pat. No. 3,262,784, as well. In general, the density of the finished product is between 0.5 and 1.0 g./cc., and typically toward the middle of that range, giving the product its desirable spongy chewing quality.

The batch material may also be converted to a particulate product. This may be accomplished by cooling the batch material, e.g. to a temperature of about 20°–40° F., and comminuting the batch material into particles of various sizes. Suitable comminuting apparatus for this purpose are well know to those skilled in the art. The particles may be graded to a desired particle size, and packaged as such.

The following examples further describes the manner and process of making the present invention and set forth the best mode contemplated for carrying out the invention, but are not be construed as limiting the invention.

EXAMPLE I 127.5 pounds of granular sucrose having an average particle size of approximately 375 microns (less than 8% passed through a 100 mesh (U.S.) screen) was placed in a Baker Perkins sigma blade mixer equipped with a steam-heated jacket. The sugar was heated to a temperature of approximately 200° F. and the steam was turned off. In a separate vessel bubble gum base was melted at a temperature of approximately 200° F. An aliquot of 20.8 pounds of the gum base was added to the mixer containing the sugar. At the same time 1.5 pounds of N & A (natural and artificial) liquid tutti-fruitti flavor and approximately 0.22 pounds of FD&C yellow #5 lake was added. Mixing was carried out until a semiliquid conglomerate of the sugar particles coated with the gum base was obtained, which required approximately five minutes. The resultant batch material was removed from the mixer while still hot and charged manually into confectionery molds. After the molded product cooled to room temperature, the individual pieces were removed from the molds ready for packaging.

EXAMPLE II

The procedure of Example I was repeated except that the bubble gum base was replaced by an adult stick gum base, and the batch size was scaled down to 2000 grams.

The resulting batch material yielded a final product having the characteristics described hereinabove.

EXAMPLE III

A first batch material was prepared in the manner described in Example I. with the exception of a scaled down batch size of 2000 grams.

A second batch material was prepared as described in Example I, except that FD&C Red #40 lake was substituted for the FD&C Yellow #5 lake, and the batch size was 2000 grams.

The two batch materials were mixed together until a uniform master batch was obtained.

The master batch was formed into a final product as described in Example I. The red and yellow coloring additives were distinctly visually discernable in the final product.

EXAMPLE IV

A first batch material was made according to the procedure of Example I except the batch size was 2000 grams.

A second batch material was prepared as described in Example I, except that the tutti frutti flavor was replaced by cherry flavor except the batch size was 2000 grams.

The two batch materials were blended until a uniform master batch was obtained.

The master batch was formed into a final product as described in Example I. The cherry and tutti frutti flavoring additives were distinctly gustatively discernable in the final product.

While the invention has been described in the terms of a presently preferred embodiment, many other embodiments will be readily apparent to those skilled in the art. The invention is therefore not limited to the embodiment described but is capable of variations and modifications without departing from the spirit and scope of the appended claims.

What is claimed is:

1. A chewing gum composition in the form of a flowable conglomerate consisting essentially of, by weight, from about 70 to about 95 percent of substantially dry granulated sugar, the predominant particle size of which is between about 210 and about 850 microns, intimately mixed with from about 5 to about 30 percent of substantially dry chewing gum base.

2. A composition according to claim 1, wherein said sugar is selected from the group of sucrose, dextrose, sorbitol, mannitol or a combination thereof.

3. A composition according to claim 1, wherein the gum base is selected from the group of bubble gum or adult chewing gum.

4. A composition of matter according to claim 1, which additionally contains at least one additive selected from the group of a coloring additive or a flavoring additive.

5. A composition according to claim 4, in the form of a shaped chewing gum product.

6. A product according to claim 5, which includes a plurality of different coloring additives, said coloring additives being distinctly visually discernable in said product.

7. A product according to claim 5, which includes a plurality of different flavoring additives, said flavoring additives being distinctly gustatively discernable in said product.

8. A composition according to claim 1, wherein the sugar is sucrose and the chewing gum base is bubble gum.

9. A composition according to claim 8, which additionally contains at least one additive selected from the group of a coloring additive or a flavoring additive.

10. A composition according to claim 9, in the form of a shaped chewing gum product.

11. A product according to claim 10, which includes a plurality of different coloring additives, said coloring additives being distinctly visually discernable in said product.

12. A product according to claim 10, which includes a plurality of different flavoring additives, said flavoring additives being distinctly gustatively discernable in said product.

13. A composition of matter in the form of a flowable conglomerate consisting essentially of an intimate blend of substantially dry granulated sugar, selected from the group consisting of sucrose, dextrose, sorbitol, mannitol or a combination thereof, the predominant particle size of said sugar being between about 210 microns and about 850 microns, substantially dry chewing gum base selected from the group of bubble gum or adult chewing gum, and at least one additive selected from the group of a coloring additive or a flavoring additive, said composition containing, by weight, from about 80 to about 90 percent of said sugar, from about 10 to about 20 percent of said chewing gum base and from about 0.4 to about 2.0 percent of said additive.

14. A composition according to claim 13, wherein the sugar is sucrose and the chewing gum base is bubble gum.

15. A process for making a shaped chewing gum product, said process comprising:
 (a) preparing a batch material by mixing substantially dry, molten chewing gum base with substantially dry granulated sugar for a time sufficient for the formation of a flowable conglomerate of said sugar particles coated with said chewing gum base; the predominant particle size of said sugar being between about 210 microns and about 850 microns, and said sugar being heated to a temperature between about 125° F. and about 200° F.; and
 (b) forming said batch material into a shaped chewing gum product.

16. A process according to claim 15, wherein said chewing gum base is rendered molten by heating to a temperature of about 130° F. to about 250° F.

17. A process according to claim 15, wherein said batch material contains, by weight, from about 70 to about 95 percent sugar and from about 5 to about 30 percent chewing gum base.

18. A process according to claim 15, wherein the sugar is selected from the group of sucrose, dextrose, sorbitol, mannitol or a combination thereof, and the chewing gum base is selected from the group of bubble gum and adult chewing gum.

19. A process according to claim 15, wherein the sugar is sucrose and the chewing gum base is bubble gum.

20. A process according to claim 15, wherein said batch material contains at least one additive selected from the group of a coloring additive or a flavoring additive.

21. A process according to claim 15, wherein the forming step involves molding said batch material into a molded chewing gum product.

22. A process according to claim 15, wherein the forming step involves sheeting said batch material and horizontally and/or vertically scoring the resultant sheet.

23. A process according to claim 15, wherein the forming step involves cooling said batch material and comminuting said cooled batch material into discrete particles.

24. A process for making a shaped chewing gum product, said process comprising:
 (a) heating substantially dry granulated sugar to a temperature between about 125° F. to about 200°

F.; said sugar being selected from the group of sucrose, dextrose, sorbitol, mannitol or a combination thereof, the predominant particle size of said sugar being between about 210 microns and about 850 microns;

(b) adding to said heated sugar substantially dry molten chewing gum base, selected from the group of bubble gum or adult chewing gum, and at least one additive selected from the group of a coloring additive, or a flavoring additive;

(c) mixing said sugar said chewing gum base and said additive for a time sufficient for the formation of a flowable conglomerate of said sugar particles coated with said chewing gum base, said additive being uniformly distributed throughout said conglomerate, the resulting mixture comprising, by weight, from about 80 to about 90 percent said sugar from about 10 to about 20 percent of said chewing gum base and from about 0.5 to about 2.0 percent of said additive; and (d) forming said mixture into a shaped chewing gum product.

25. A product made according to the process of claim 24.

26. A process according to claim 25, wherein the sugar is sucrose and the chewing gum base is bubble gum.

27. A product made according to the process of claim 26.

28. A process for preparing a shaped, multi-colored chewing gum product, said process comprising:

(a) preparing a first batch material by mixing substantially dry, molten chewing gum base with substantially dry granulated sugar and a first coloring additive, for a time sufficient for the formation of a flowable conglomerate of said sugar particles coated with said chewing gum base, said first coloring additive being uniformly distributed throughout said conglomerate;

(b) preparing a second batch material by mixing substantially dry, molten chewing gum base with substantially dry granulated sugar and a second coloring additive, for a time sufficient for the formation of a flowable conglomerate of said sugar particles coated with said chewing gum base, said second coloring additive being uniformly distributed throughout said conglomerate;

(c) combining said first batch material and said second batch material into a master batch material; and (d) forming said master batch material into a shaped chewing gum product characterized in that the first and second coloring additives are distinctly visually discernable in said product, thereby imparting a multi-colored appearance to said product.

29. A process according to claim 25, wherein at least one flavoring additive is incorporated in the master batch material.

30. A product made according to the process of claim 29.

31. A process according to claim 29, wherein the sugar is sucrose and the chewing gum base is bubble gum.

32. A product made according to the process of claim 31.

33. A process for preparing a shaped, multi-flavored chewing gum product, said process comprising:

(a) preparing a first batch material by mixing substantially dry, molten chewing gum base with substantially dry granulated sugar and a first flavoring additive, for a time sufficient for the formation of a flowable conglomerate of said sugar particles coated with said chewing gum base, said first flavoring additive being uniformly distributed throughout said conglomerate;

(b) preparing a second batch material by mixing substantially dry, molten chewing gum base with substantially dry granulated sugar and a second flavoring additive, for a time sufficient for the formation of a flowable conglomerate of said sugar particles coated with said chewing gum base, said second flavoring additive being uniformly distributed throughout said conglomerate;

(c) combining said first batch material and said second batch material into a master batch material; and (d) forming said master batch material into a shaped chewing gum product characterized in that the first and second flavoring additives are distinctly gustatively discernable in said product, thereby imparting a multi-flavored taste to said product.

34. A process according to claim 33, wherein at least one flavoring additive is incorporated in the master batch material.

35. A product made according to the process of claim 33.

36. A process according to claim 33, whwerein the sugar is sucrose and the chewing gum base is bubble gum.

37. A product made according to the process of claim 36.

* * * * *

UNITED STATES PATENT AND TRADEMARK OFFICE
CERTIFICATE OF CORRECTION

PATENT NO. : 4,588,592
DATED : May 13, 1986
INVENTOR(S) : Ronald J. Elias

It is certified that error appears in the above—identified patent and that said Letters Patent is hereby corrected as shown below:

Claim 26, column 9, line 26, "25" should be --24--.

Claim 36, column 10, line 47, "whwerein" should be --wherein--.

Signed and Sealed this

Eleventh Day of November, 1986

Attest:

DONALD J. QUIGG

Attesting Officer    Commissioner of Patents and Trademarks